(12) United States Patent
Anjo et al.

(10) Patent No.: US 7,680,962 B2
(45) Date of Patent: Mar. 16, 2010

(54) STREAM PROCESSOR AND INFORMATION PROCESSING APPARATUS

(75) Inventors: Kenichiro Anjo, Kanagawa (JP); Katsumi Togawa, Kangawa (JP); Ryoko Sasaki, Kanagawa (JP); Taro Fujii, Kanagawa (JP); Masato Motomura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 200 days.

(21) Appl. No.: 11/312,411

(22) Filed: Dec. 21, 2005

(65) Prior Publication Data
US 2006/0161696 A1    Jul. 20, 2006

(30) Foreign Application Priority Data
Dec. 22, 2004    (JP) .............................. 2004-371654

(51) Int. Cl.
*G06F 13/28* (2006.01)
*G06F 3/00* (2006.01)
*G06F 5/00* (2006.01)
*G06F 15/00* (2006.01)
*G06F 9/44* (2006.01)

(52) U.S. Cl. .............................. 710/22; 710/5; 710/52; 709/212; 712/10; 712/18; 712/34; 712/225

(58) Field of Classification Search .................... 710/22
See application file for complete search history.

(56) References Cited
U.S. PATENT DOCUMENTS

| 6,349,346 | B1 | 2/2002 | Hanrahan et al. |
| 6,411,984 | B1* | 6/2002 | Leach et al. ................. 709/200 |
| 6,738,891 | B2* | 5/2004 | Fujii et al. ..................... 712/16 |
| 7,251,722 | B2* | 7/2007 | Sikdar et al. ................. 712/300 |
| 2001/0018733 | A1 | 8/2001 | Fujii et al. |
| 2003/0007636 | A1 | 1/2003 | Alves et al. |
| 2003/0105949 | A1 | 6/2003 | Master et al. |
| 2003/0126404 | A1 | 7/2003 | Anjo et al. |

FOREIGN PATENT DOCUMENTS

| JP | 05-303493 | 11/1993 |
| JP | 11-167556 | 6/1999 |
| JP | 2001-312481 | 11/2001 |
| JP | 2003-196246 | 7/2003 |
| JP | 2004-118713 A | 4/2004 |

OTHER PUBLICATIONS

Amano, Hideharu et al., "A dynamically adaptive switching fabric on a multicontext reconfigurable device," Proceeding of International Field Programmable Logic and Application Conference, Sep. 2003, pp. 161-170.
K. Compton, et al. "Reconfigurable Computing: A Survey of Systems and Software," ACM Computing Surveys, vol. 34:2, Jun. 2002, pp. 171-210.
R. Enzler, "Architecture Trade-offs in Dynamically Reconfigurable Processors," Doctoral Thesis Dissertation, No. 115423, Jan. 2004, pp. 1-153.

* cited by examiner

*Primary Examiner*—Henry W. H. Tsai
*Assistant Examiner*—Michael Sun
(74) *Attorney, Agent, or Firm*—Foley & Lardner LLP

(57) ABSTRACT

An array type processor comprises a data path unit to execute processing, and a state management unit to control the state of the data path unit in accordance with a command that specifies processing on the data. An input DMA circuit reads from a memory information and data to be processed including a command corresponding to the data. The input DMA circuit first transfers the command to the state management unit, and then transfers the data to be processed to the data path unit.

18 Claims, 13 Drawing Sheets

CHSEL: channel select
TID: transaction identifier
CMD: command
ISIZE: data size
RADR: return data address
IARD: input data address

STREAM PROCESSOR AND INFORMATION PROCESSING APPARATUS

BACKGROUND OF THE INVENTION

1. Field of the Invention

The present invention relates to a stream processor which comprises an array type processor for implementing a variety of processing, and an information processing apparatus which comprises the stream processor.

2. Description of the Related Art

Recent information processing apparatuses are utilized in increasingly wider applications because their processing capabilities are more improved, and because they are required to have capabilities that provide higher processing performance or process an immense amount of data such as still images and moving images at high speeds.

For satisfying such demands, there has been known an information processing apparatus which comprises, in addition to a host processor, a DSP (Digital Signal Processor) which is dedicated to executing predetermined processing such as processing moving images. However, since the DSP is limited in the kind of processing, the applicant has proposed an array type processor which can be modified by software in the configuration of a data path for executing operational processing. Array type processors are described in Japanese laid-open patent publication No. 2001-312481 (hereinafter called "Patent Document 1"), Japanese laid-open patent publication No. 2003-196246 (hereinafter called "Patent Document 2"), and Non-Patent Document 1 (Hideharu Amano, Akiya Jouraku, Kenichiro Anjo, "A dynamically adaptive switch fabric on a multicontext reconfigurable device," Proceeding of International Field Programmable Logic and Application Conference, September 2003, p 161-170), and the like.

An array type processor comprises data path unit 105 for executing operational processing, and state management unit 106 for controlling the operation of data path unit 105. Data path unit 105 comprises a plurality of processor elements, and a plurality of switch elements associated therewith, and executes a variety of processing by using software to switch instruction codes supplied to each processor element and to each switch element. FIG. 1 illustrates an information processing apparatus disclosed in Patent Document 2. The information processing apparatus illustrated in FIG. 1 has MPU 101, stream processor 102 which comprises array type processor 104, and input/output control circuit 107 for controlling input/output of data to/from array type processor 104; memory 103 for temporarily storing data supplied to or delivered from stream processor 102; and bus 108 for interconnecting stream processor 102 and memory 103. Stream processor 104 can execute a plurality of processing sessions in parallel if it is provided with a plurality of array type processors 104.

The array type processor fundamentally differs from a CPU, a DSP and the like in structure and operation. To have the array type processor execute certain types of processing, the type of the processing needs to be specified before the data that is to be processed is sent to the array type processor, and the array type processor needs to have been set in a state before it can execute the processing. In other words, there is a problem with the array type processor in that a certain period of time is required until it is ready to execute processing after the type of processing has been specified, so that data processing efficiency is accordingly reduced.

For example, in the array type processor illustrated in FIG. 1, the data path unit first receives a command for specifying processing from the input/output control circuit. The command is decoded to generate an event which is then transferred to the state management unit. The state management unit returns to the data path unit an instruction pointer (indicative of an instruction code address at which an associated instruction code is stored) that corresponds to the event transferred from the data path unit. The data path unit switches the states of the processor element and switch element, respectively, in accordance with the instruction code specified by the instruction pointer (state transition). Then, the data path unit receives data to be processed from the input/output control circuit to start the specified processing after the state transition has been completed. In this way, the array type processor shown in FIG. 1 requires a long time before it starts processing data applied thereto because the array type processor analyzes the type of command in the data path unit, and transitions to a state in which it can execute processing specified by the command under control of the state management unit.

On the other hand, the aforementioned Non-Patent Document 1 shows an example which implements a four-input/four-output cross-bar switch using an array type processor. As illustrated in FIG. 2, Non-Patent Document 1 describes a state transition diagram, as an operation of a cross-bar switch, which shows that the array type processor transitions from initial state FC to state 00 among states 00/10/20/30, again transitions to state 01, 02 or 03, and returns to initial state FC after processing is terminated. Non-Patent Document 1 clearly states that a latency of several cycles is needed until a desired circuit is started after the array type processor determines a condition for transitioning to the next state.

There are a variety of types of processing which can be executed by array type processors. For example, other data can be read from memory during processing, and processing can be continued using the read data.

While an array type processor comprises a built-in memory, its memory capacity is often limited. Therefore, in processing that is executed by the array type processor, when reference is needed, in the middle of processing, to a table or data which requires a large storage capacity, access must be made to a memory which stores them. This memory corresponds, for example, to memory 103 shown in FIG. 1. To access memory from the array type processor, the array type processor may issue a command and an address for reading/writing data and transmit write data when the data is to be written, or it may receive read data retrieved from the memory when the data is read.

For example, when the array type processor execute processing session A and processing session B and processing session A is divided into processing sub-sessions A-a, A-b, A-c that correspond to accesses made to a memory in order to execute processing session A, as illustrated in FIG. 3, the array type processor, upon receipt of data, determines the type of the data, i.e., whether the data is intended for processing session A or processing session B. Then, determining that the data is intended for processing session A, the array type processor executes processing sub-session A-a for the data, accesses the memory to read data for use in the next processing sub-session A-b upon termination of processing sub-session A-a, and executes processing sub-session A-b together with data that results from processing sub-session A-a. When processing sub-session A-b is terminated, the array type processor again accesses memory to read data for use in the next processing sub-session A-c, and executes processing sub-session A-c together with data that results from processing sub-session A-b. Finally, when processing sub-session A-c is terminated, the array type processor accesses memory to write data that results from processing sub-session A-c, and returns to state of a determination of data type.

Here, in the conventional array type processor, when the array type processor issues a read address (issuance of the memory address) to the memory for reading data upon termination of processing sub-session A-a and processing sub-session A-b, the array type processor interrupts the operation (for waiting for data from the memory) until it receives data read from the memory (reception of memory data). Consequently, this interruption of the operation also causes a lower processing efficiency of the array type processor.

SUMMARY OF THE INVENTION

It is therefore an object of the present invention to provide a stream processor and an information processing apparatus, each comprising an array type processor, which are capable of improving the processing efficiency of the array type processor.

To achieve the above object in the present invention, a stream processor has an array type processor including a data path unit for executing processing, and a state management unit for controlling the state of the data path unit in accordance with a command for specifying processing which should be executed on the data, and an input DMA circuit for reading data to be processed, and for reading information including a command that corresponds to the data from the memory, transferring first the command to the state management unit, and subsequently transferring the data to be processed to the data path unit.

An information processing apparatus of the present invention in turn has a host processor, the stream processor, and a memory for storing data used in processing of the host processor and stream processor.

In the configuration as described above, the input DMA circuit first transfers a command for specifying the processing of data to the state management unit of the array type processor, and subsequently transfers data to be processed to the data path unit, so that the command is analyzed by the state management unit, and the data path unit is switched to a state corresponding to the command before it can receive and process the data that to be processed. Also, the state management unit can receive a command that will to processed next and can analyze this command while the data path unit is processing data.

Thus, the data path unit does not need to analyze commands, as opposed to the conventional array type processor illustrated in FIG. 1, resulting in a reduced overhead of processing, which would otherwise be caused by analyzing on commands, and an improvement in the processing efficiency of the stream processor equipped with the array type processor and the overall information processing apparatus as well.

The above and other objects, features, and advantages of the present invention will become apparent from the following description with reference to the accompanying drawings which illustrate examples of the present invention.

DETAILED DESCRIPTION OF THE INVENTION

First, a description will be given of an information processing apparatus which comprises a stream processor according to the present invention.

Figure 4:
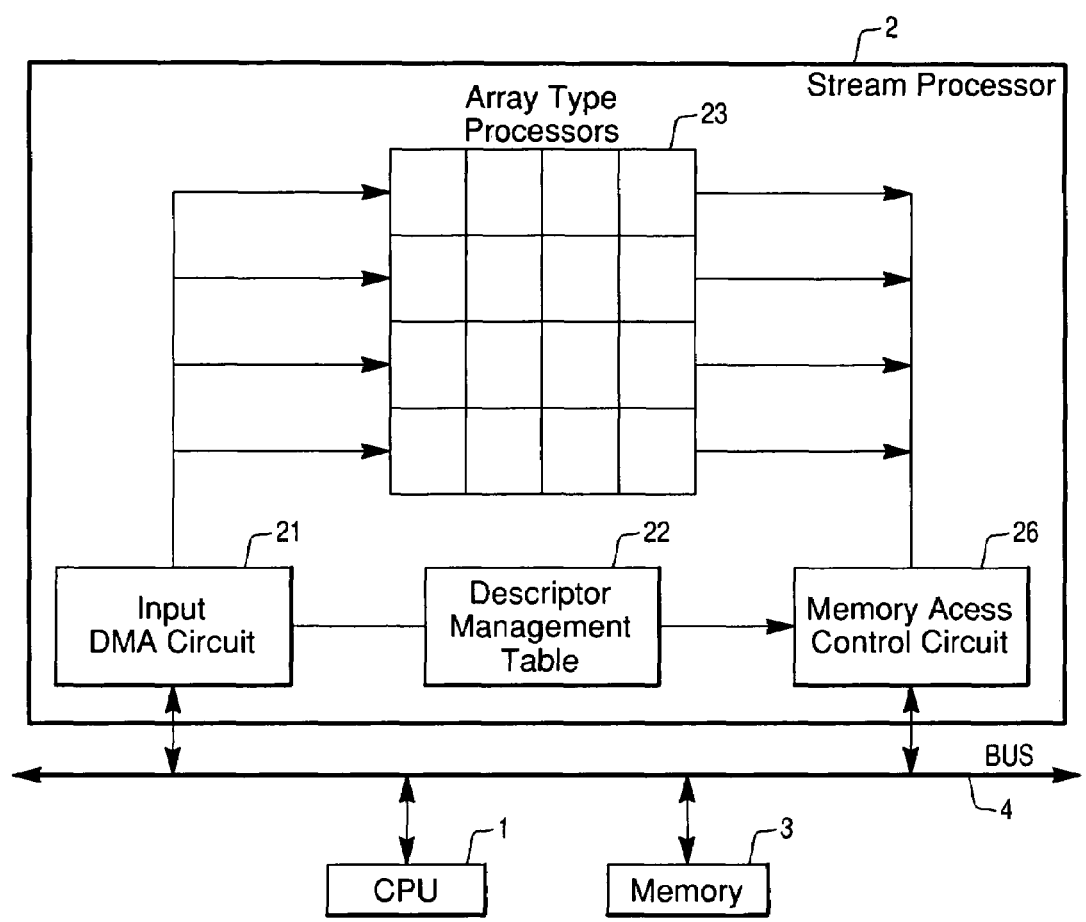
FIG. 4 is a block diagram illustrating an exemplary configuration of an information processing apparatus which has a stream processor according to the present invention.

FIG. 4 is a block diagram illustrating an exemplary configuration of the information processing apparatus which has a stream processor according to the present invention.

As illustrated in FIG. 4, the information processing apparatus comprises CPU 1 which is a host processor; stream processor 2 which can execute a plurality of processing sessions in parallel; and memory 3 for storing data to be processed by CPU 1 and stream processor 2, and data resulting from processing, and the like. CPU1, stream processor 2, and memory 3 are interconnected through bus 4 for transmission and reception of data to and from one another. Memory 3 stores data to be processed by CPU 1 and stream processor 2, processed data, and a descriptor comprised of a variety of information for use in identifying the data.

The host processor need not be a CPU but may be a DSP or another processing device as long as it can process and control the overall information processing apparatus. Memory 3 may be of any type as long as it supplies data when stream processor 2 issues a read command for reading the data, and includes item which is mapped to an entire memory address space connected to bus 4. For example, stream processor 2 may be supplied with data which is applied to the information processing apparatus through an input/output device, not shown, which has a FIFO memory.

Stream processor 2 comprises input DMA circuit 21 for reading data to be processed from memory 3; descriptor management table 22 for managing descriptors; a plurality of array type processors 23 capable of executing a plurality of processing sessions in parallel; and memory access control circuit 26 for writing processing results provided by array type processors 23 (output data) back into memory 3. Input DMA circuit 21, descriptor management table 22, and memory access control circuit 26, each of which may comprise, for example, logic circuits, memories and the like, may be configured such that a variety of types processing tasks can be implemented by stream processor 2, as described below, using the CPU (or DSP).

Stream processor 2 comprises a plurality of array type processors 23 arranged in a lattice shape, and is formed with a plurality of channels (processing paths) for executing processing sessions by using the plurality of array type processors 23. Data applied to stream processor 2 is supplied to any channel by input DMA circuit 21 such that appropriate processing of the data is executed. FIG. 4 illustrates an example in which four channels are formed in stream processor 2.

Input DMA circuit 21 stores a descriptor pointer that indicates the address in memory 3 where each descriptor is stored. The value of the descriptor pointer is set, for example, by CPU 1 equipped in the information processing apparatus in accordance with a program for controlling the stream processor stored in memory 3. To cause stream processor 2 to execute certain type of processing, CPU 1 sets an address pointer that indicates the start address of descriptor to be processed in a descriptor pointer of input DMA circuit 21.

Input DMA circuit 21 first reads the descriptor that corresponds to a descriptor pointer from memory 3, and registers the descriptor in descriptor management table 22. Also, input DMA circuit 21 reads data to be processed from memory 3 based on a variety of information in the registered descriptor, and supplies the data to a channel specified by array type processor 23 together with a command for specifying processing that is to be executed by array type processor 23.

The data processed by array type processor 23 is supplied to memory access control circuit 26. Memory access control circuit 26 stores the processed data in an address area of memory 3 that is specified on the basis of information in a corresponding descriptor, registered in descriptor management table 22.

Figure 5:
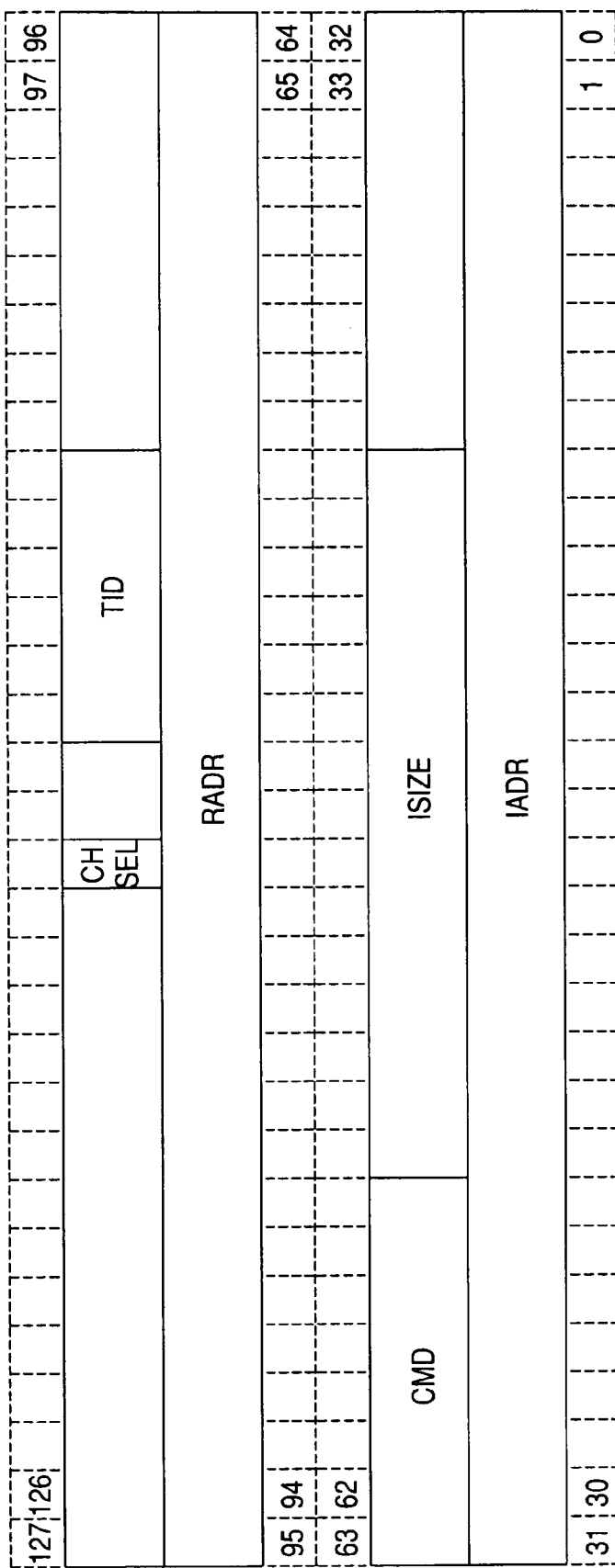
FIG. 5 is a schematic diagram showing a format for a descriptor used in the stream processor shown in FIG. 4.

FIG. 5 is a schematic diagram showing a format for a descriptor used in the stream processor illustrated in FIG. 4. In FIG. 5, the descriptor is of 128 bits. However, the amount of information represented by the descriptor may be changed depending on the width of bits processed by CPU 1 and array-type processors 23 or the size of the memory space in memory 3. In FIG. 5, areas free of field names are idle areas used as reserves.

As shown in FIG. 5, the descriptor used in this embodiment comprises fields labeled CHSEL (channel select), TID (transaction identifier), CMD (command), ISIZE (data size), RADR (return data address ), and IADR (input data address).

TID (transaction identifier) shown in FIG. 5 is a field for storing an identifier to identify data which is to be processed by stream processor 2. The value of TID is supplied to array type processor 23, for example, together with data to be processed (input data), and output together with processed data (output data) from array-type processors 23. As such, the value of TID can be relied on to manage a relationship that shows the correspondence between data before and after processing by array type processor 23. For example, determination of plurality of data can be realized by using the value of TID even when this plurality of data is undergoing the same processing.

CHSEL (channel select) is a field for specifying a channel which processes data read from memory 3, and comprises the number of bits corresponding to the number of channels (the number of array type processors 23) which execute processing in parallel.

IADR (input data address) is a field for storing a data buffer pointer indicative of a memory address for data (input data) which is to be processed by stream processor 2. RADR (return data address) is a field for storing a data buffer pointer indicative of a memory address at which data processed by stream processor 2 (output data) is stored. ISIZE in turn is a field for storing information indicative of the size of data to be processed by stream processor 2.

Stream processor 2 reads data of a size specified by ISIZE from an address specified by IADR, and supplies the data (input data) to array type processor 23 specified by CHSEL. Stream processor 2 also stores data processed by array type processor 23 (output data) in an address area which starts with an address specified by RADR.

CMD (command) is a field for specifying the type of processing for array type processor 23. Array type processor 23 switches processing to be executed thereby in accordance with the value in the CMD field.

The aforementioned value of TID may be given so as to distinguish data on a command-by-command basis, or given so as to distinguish each data irrespective of commands. For example, when data is distinguished on a command-by-command basis, the same value of TID may be used by each command. On the other hand, when each data is distinguished irrespective of commands, for example, when TID=1 is used for processing A, TID=1 may not be used for processing B.

First Embodiment

Next, referring to the drawings, a description will be given of a first embodiment of the stream processor according to the present invention which is suitable for application to the information processing apparatus illustrated in FIG. 4.

Figure 6:
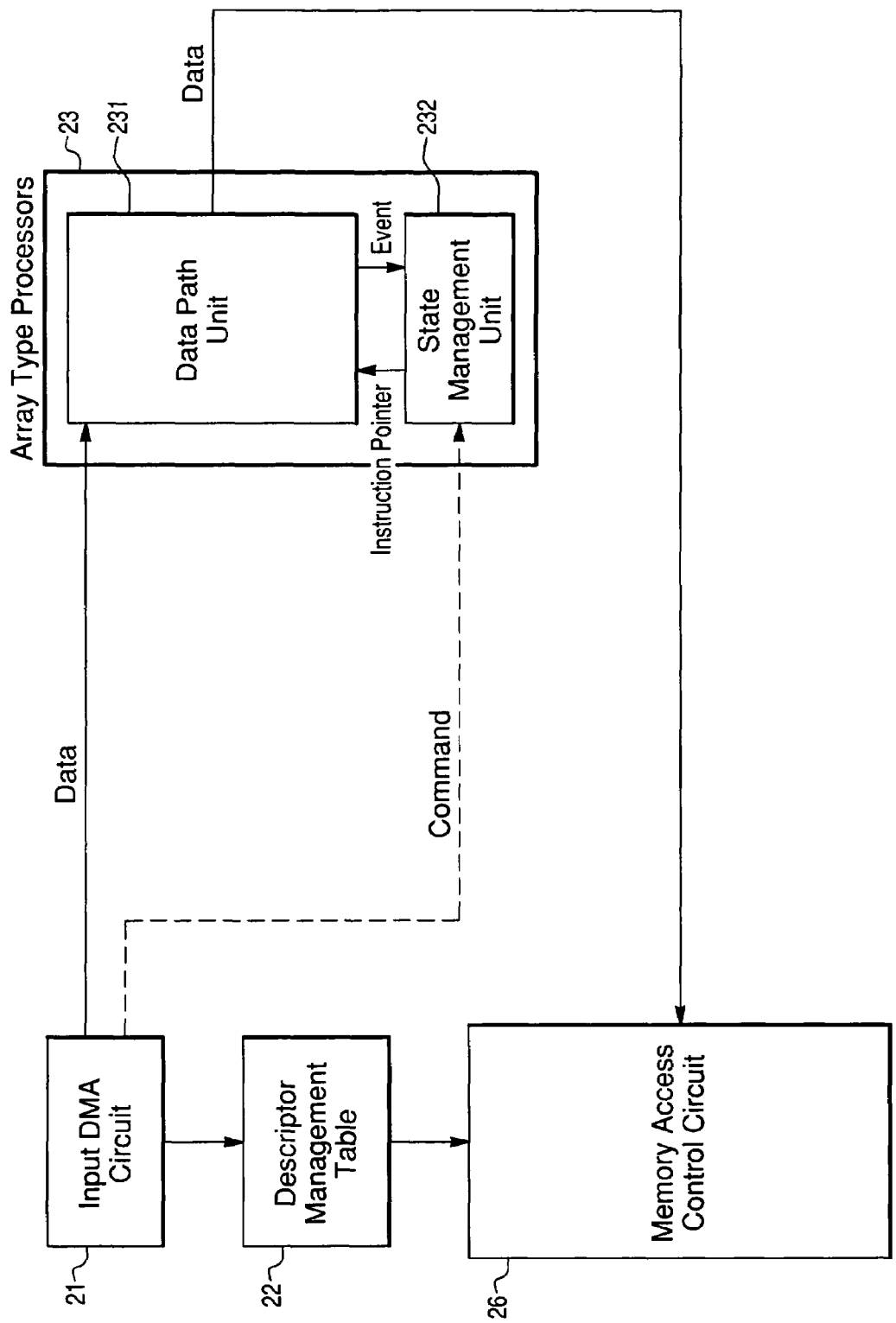
FIG. 6 is a block diagram illustrating the configuration of a first embodiment of the stream processor according to the present invention.

FIG. 6 is a block diagram illustrating the configuration of the first embodiment of the stream processor according to the present invention.

As illustrated in FIG. 6, the stream processor of this embodiment is configured such that input DMA circuit 21 supplies a command on an individual basis extracted from a descriptor to state management unit 232 of array type processor 23, and supplies data to be processed, read from memory 3 in accordance with the descriptor, to data path unit 231. FIG. 6 just illustrates a connection relationship among single array type processor 23 which comprise a single channel, input DMA circuit 21, descriptor management table 22 and memory access control unit 26. Another array type processor 23 may be connected to Input DMA circuit 21, descriptor management table 22, and memory access control unit 26, as illustrated in FIG. 6, or another array type processor 23 may be connected to commonly utilized input DMA circuit 21, descriptor management table 22, and memory access control unit 26, as illustrated in FIG. 4.

Figure 7:
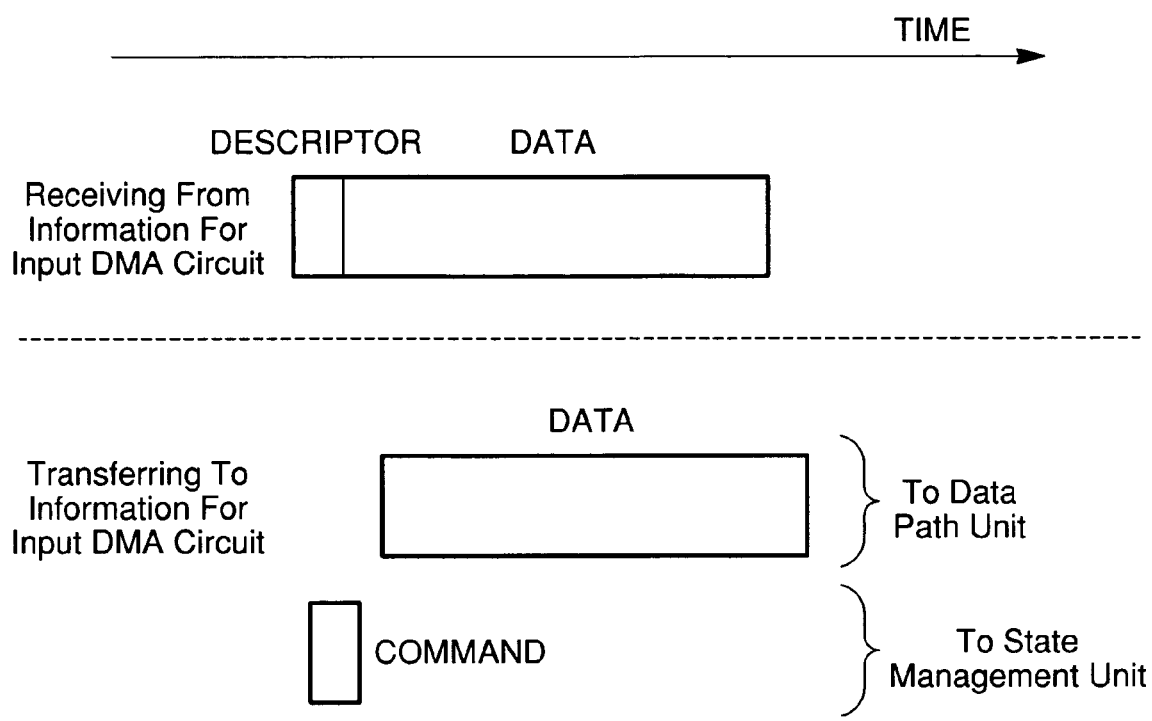
FIG. 7 is a timing chart representing data transmission/reception timings of an input DMA circuit shown in FIG. 4.

As illustrated in FIG. 7, input DMA circuit 21 reads a descriptor and data in sequence from memory 3. Also, input DMA circuit 21 first transfers a command extracted from the descriptor to state management unit 232, and then transfers data to be processed to data path unit 231.

State management unit 232 included in array type processor 23 of this embodiment has a function of receiving a command from the outside, and causing data path unit 231 to transition to a state in accordance with the command. Specifically, state management unit 232 comprises a register for storing a command transferred from input DMA circuit 21, and a logic circuit and the like for generating a state number associated with the value in the register when state management unit 232 is in a waiting state without executing a command analysis or the like.

The function of state management unit 232 for receiving a command from the outside is not described either in Patent Documents 1, 2 or in Non-Patent Document 1.

The value of the CMD field used in this embodiment is preferably made consistent with the state number of a state to which data path unit 231 should first transition, for example, when data path unit 231 executes processing that corresponds to the command. This "state" refers to the state of a processor element and a switch element which are components of data path unit 231. State management unit 232 comprises a state transition table memory for storing a state transition table which describes transition rules among a plurality of states; a sequence unit for controlling the transition among the plurality of states using the state transition memory to determine the next state; and a control information memory for supplying data path unit 231 with an instruction code address (instruction pointer) which is the address of the instruction memory where an instruction code is stored (none of these components are shown in the figure) (See Patent Document 1 mentioned above), and delivers an instruction pointer to data path unit 231 in accordance with a current state number. The state number is switched by an event transferred from data path unit 2 or by a command from the outside, as previously described above.

When the value of the CMD field is made consistent with the state number of a state to which a transition should be first made in the foregoing manner, state management unit 232 can reduce the time required for analyzing a command. If the value of the CMD field is not consistent with the state number of the state to which a transition should be first made, state management unit 232 may acquire the state number of the state to which a transition should be first made by referencing a command reference table which records the relationship between previously stored commands and state numbers.

While the foregoing description describes exemplary state management unit 232 which comprises a logic circuit for controlling the state of data path unit 231 in accordance with the state number, state management unit 232 may comprise, for example, a CPU. In this configuration, a program counter may be used in place of the state number, such that the value of the program counter may be switched in response to an event transferred from data path unit 231 or in response to a command given from the outside.

According to the stream processor of this embodiment, input DMA circuit 21 first transfers a command for specifying the contents of processing to state management unit 232 of array type processor 23, and then transfers data to be processed to data path unit 231, so that state management unit 232 can first analyze the command, and data path unit 231 can receive the data and execute the processing thereon after it has switched to a state corresponding to the command. Also, state management unit 232 is able to receive a command which should be next processed, and is able to analyze the command beforehand during the processing of the data by data path unit 231.

Figure 1:
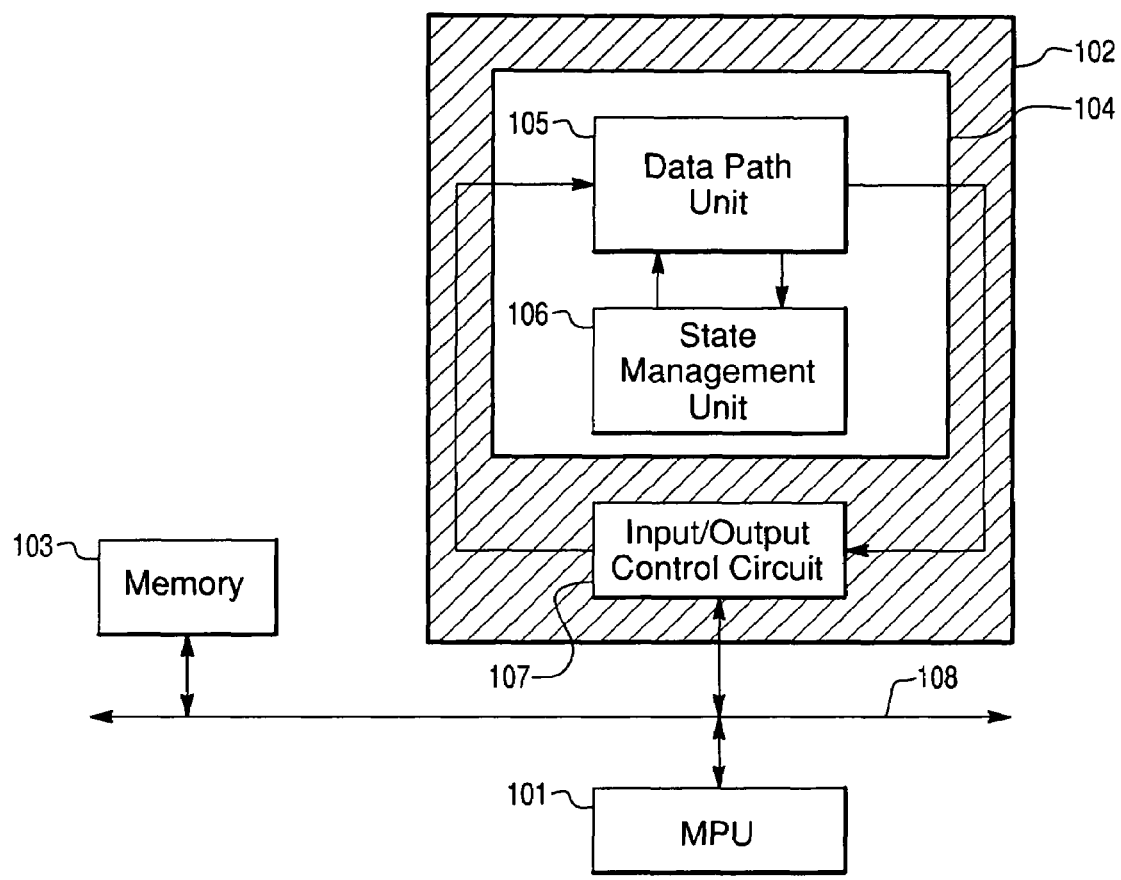
FIG. 1 is a block diagram illustrating the configuration of an information processing apparatus which comprises a conventional stream processor.
Figure 2:
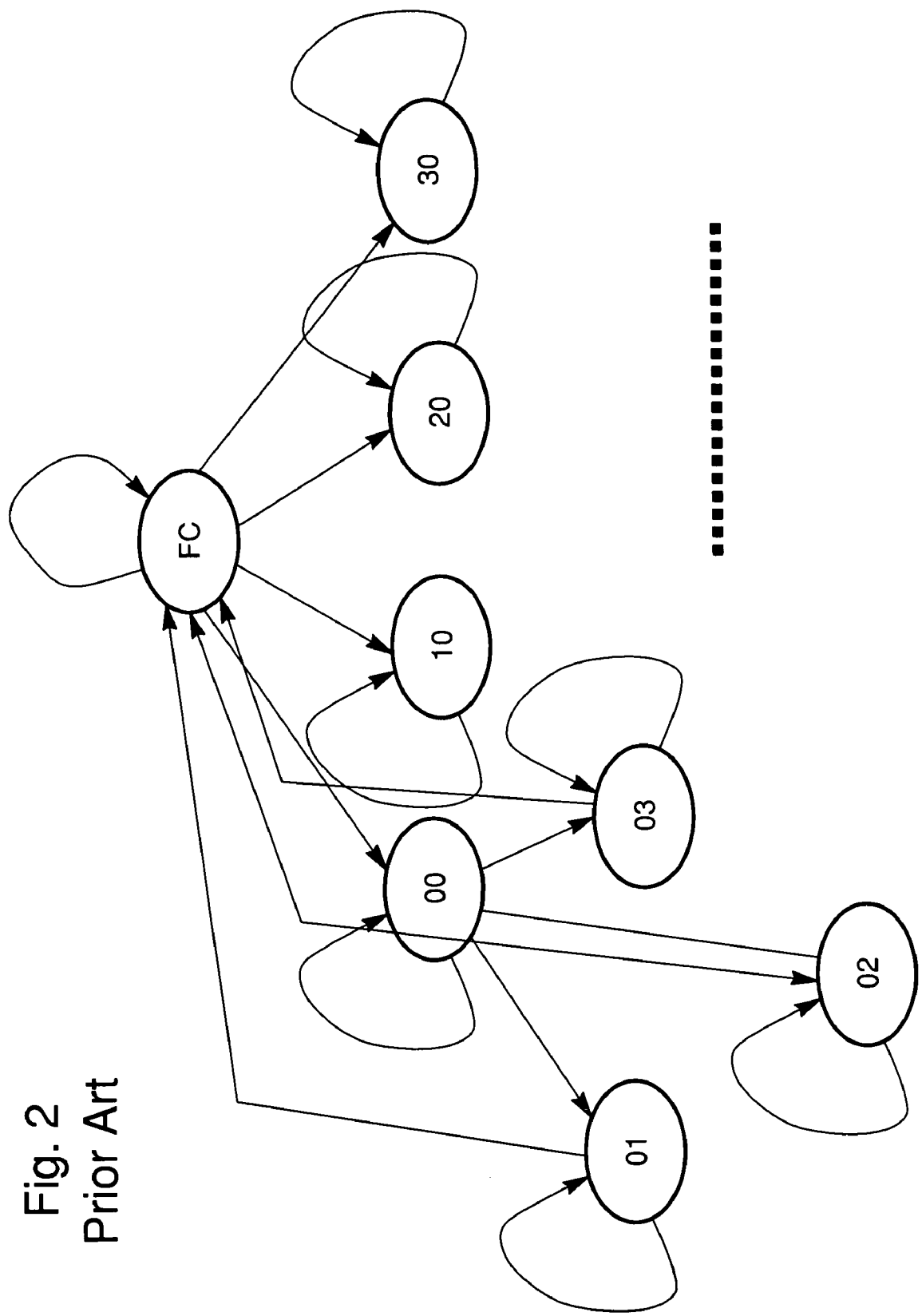
FIG. 2 is a state transition diagram illustrating an exemplary operation of a conventional array type processor.

Thus, data path unit 231 does not need to analyze a command, as is required by the conventional array type processor illustrated in FIG. 1, resulting in a reduction in overhead of processing that are caused by the analysis of commands. Consequently, the array type processor can improve data processing efficiency. This further leads to improved processing efficiencies of stream processor 2 equipped with the array type processor and an improved overall information processing apparatus.

Second Embodiment

Next, referring to the drawings, a description will be given of a second embodiment of the stream processor according to the present invention which is suitable for application to the information processing apparatus illustrated in FIG. 4.

Figure 8:
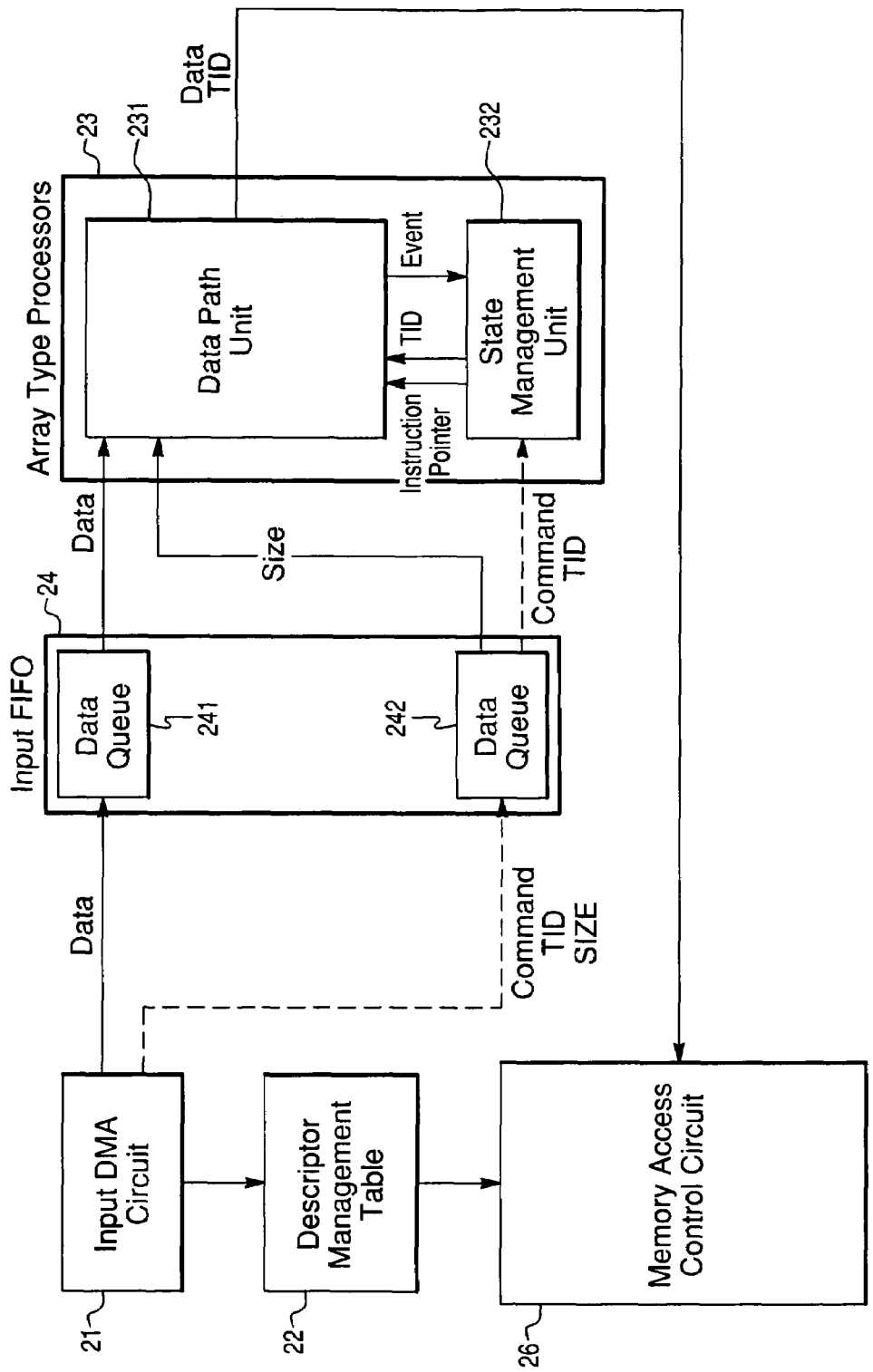
FIG. 8 is a block diagram illustrating the configuration of a second embodiment of the stream processor according to the present invention.

FIG. 8 is a block diagram illustrating the configuration of the second embodiment of the stream processor according to the present invention.

As illustrated in FIG. 8, in addition to the configuration of the stream processor shown in the first embodiment, the stream processor of the second embodiment further comprises input FIFO 24 for temporarily holding data, a command and the like supplied from input DMA circuit 21 to array type processor 23. Like FIG. 6, FIG. 8 just illustrates a connection relationship among single array type processor 23 and single input FIFO 24 which comprise a single channel associated therewith, input DMA circuit 21, descriptor management table 22 and memory access control unit 26. Another array type processor 23 and input FIFO 24 may be connected to Input DMA circuit 21, descriptor management table 22, and memory access control unit 26, as illustrated in FIG. 8, and another array type processor 23 and input FIFO 24 may be connected to commonly utilized input DMA circuit 21, descriptor management table 22, and memory access control unit 26, as illustrated in FIG. 4.

As illustrated in FIG. 8, input FIFO 24 comprises data queue 241 for temporarily holding data to be processed which is supplied to data path unit 231; and command queue 242 for temporarily holding a command supplied to state management unit 232. The data to be processed, transferred from input DMA circuit 21, is supplied to data path unit 231 through data queue 241, while the command transferred from input DMA circuit 21 is supplied to state management unit 232 through command queue 242.

Further, in the stream processor of this embodiment, the transaction ID (TID) corresponding to data to be processed, and information on the size of the data, which are extracted from a data descriptor, are each transferred from input DMA circuit 21 to command queue 242 together with the command. Command queue 242 supplies state management unit 232 with both the command and TID transferred from input DMA circuit 21 and supplies data path unit 231 with the size information.

In this event, input DMA circuit 21 reads the descriptor and data in sequence from memory 3, and in a manner similar to the first embodiment, first transfers the command and TID to command queue 242, and then transfers the data to be processed to data queue 241.

Information on the data size need not be necessarily supplied to data path unit 231. When information about the size of data is supplied to data path unit 231, data path unit 231 does not need to use this information to detect the end of received data, therefore processing becomes simplified.

Data path unit 231 of array type processor 23 transfers processed data and the value of TID corresponding the processed data to memory access control circuit 26. Array type processor 23 may be provided with an output FIFO on the output side for temporarily holding the result of processing by array type processor 23 (output data). The configuration comprising the output FIFO can absorb differences in data transfer rate and clock rate between array type processor 23 and memory access control circuit 26.

According to the stream processor of this embodiment, input FIFO 24 is added in order to hold data to be processed and to hold a command for specifying processing of the data, thereby making it possible to supply a command which should be next processed from command queue 242 to state management unit 232 simultaneously with the action of state management unit 232 in ending analysis of the command, and thereby also making it possible to supply data to be next processed from data queue 241 to data path unit 231 simultaneously with the action of data path unit 231 in ending processing.

Therefore, when a plurality of processing is executed, commands and data can be continuously supplied to array type processor 23 in an efficient manner without interrupting the operation of array type processor 23, thus improving the processing efficiency of array type processor 23.

Also, even if there is a latency until transition to a state in which array type processor 23 can analyze a command for each processing, and execute corresponding processing, other processing can be executed in the meantime in parallel, thus further improving the processing efficiency of array type processor 23. This results in improved processing efficiencies of stream processor 2 equipped with the array type processor and an improved the overall information processing apparatus.

Third Embodiment

Next, referring to the drawings, a description will be given of a third embodiment of the stream processor according to the present invention which is suitable for application to the information processing apparatus illustrated in FIG. 4.

Figure 9:
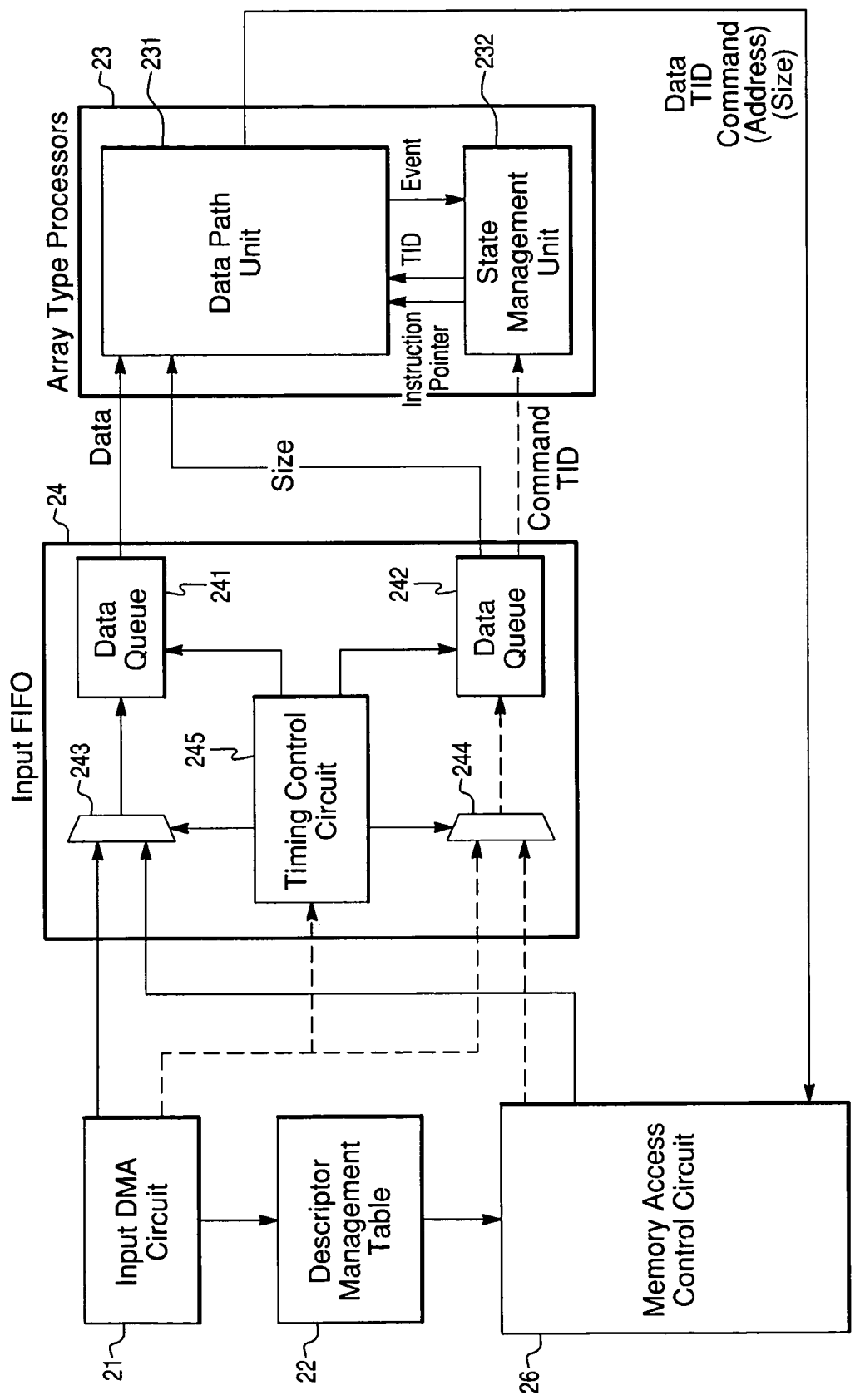
FIG. 9 is a block diagram illustrating the configuration of a third embodiment of the stream processor according to the present invention.

FIG. 9 is a block diagram illustrating the configuration of the third embodiment of the stream processor according to the present invention. Like FIG. 6 and FIG. 8, FIG. 9 just illustrates a connection relationship among single array type processor 23 and single input FIFO 24 which comprise a single channel associated therewith, input DMA circuit 21, descriptor management table 22 and memory access control unit 26. Another array type processor 23 and input FIFO 24 may be connected to Input DMA circuit 21, descriptor management table 22, and memory access control unit 26, as illustrated in FIG. 9, and another array type processor 23 and input FIFO 24 may be connected to commonly utilized input DMA circuit 21, descriptor management table 22, and memory access control unit 26, as illustrated in FIG. 4. In addition, array type processor 23 may be provided with an output FIFO on the output side to temporarily hold the result of processing by array type processor 23 (output data), as is the case with the second embodiment.

As described above, though array type processor 23 comprises an internal memory, its storage capacity is often limited, so that for referencing a table or data which requires a large storage capacity, array type processor 23 must access to memory 3, which stores the table or data, in the middle of processing.

As illustrated in FIG. 9, in addition to the configuration of the stream processor illustrated in the second embodiment, the stream processor of the third embodiment comprises memory access control circuit 26 which has a function of reading data from memory 3 and writing data into memory 3 in response to instructions from data path unit 231 of array type processor 23, in addition to the function of writing processed data delivered from array type processor 23 back into memory 3.

In addition, in order that memory access control circuit 26 can supply array type processor 23 with data read from memory 3 and a corresponding command, TID and information on the size of the data, input FIFO 24 in this embodiment comprises first selector 243 for supplying data queue 241 with data from input DMA circuit 21 or from memory access control circuit 26; second selector 244 for supplying command queue 242 with the size, command, and transaction identifier from input DMA circuit 21 or from memory access control circuit 26; and timing control circuit 245 for controlling switching operations made by the first and second selectors.

In the event that data supplied from input DMA circuit 21 to data queue 241 conflicts with data supplied from memory access control circuit 26 to data queue 241, or in the event that a command and TID supplied from input DMA circuit 21 to command queue 242 conflicts with a command and TID supplied from memory access control circuit 26 to command queue 242, timing control circuit 245 arbitrates these conflicts. Arbitrating these conflicts can be done by timing control circuit 245 according to a method of simply processing signals in which a higher priority is given to the signal which arrive earlier, a method in which higher priority is given, at all times, to signals from input DMA circuit 21 or memory access control circuit 26, and the like.

Also, data path unit 231 of array type processor 23 in this embodiment has a function of issuing to memory access control circuit 26 a read command or a write command, an address for memory 3, which is accessed, a corresponding TID, a data size, and a next-processed command for specifying processing which is resumed when data read from memory 3 is returned.

To read data from memory 3 through memory access control circuit 26, data path unit 231 generates a read command, an address indicative of an area in which the data is stored, information on the size of the area, a TID, and a next-processed command for transfer to memory access control circuit 26. Memory access control circuit 26 transfers the read command to memory 3 based on the address and size information received from data path unit 231, reads necessary data from memory 3, and transfers the data, together with a corresponding TID and the next-processed command to input FIFO 24 of a specified channel. To write data into memory 3 through memory access control circuit 26, data path unit 231 delivers write data (processed data) together with a TID corresponding thereto. Information on the size of data may be added to the write data when it is transferred to memory access control circuit 26.

Figure 10:
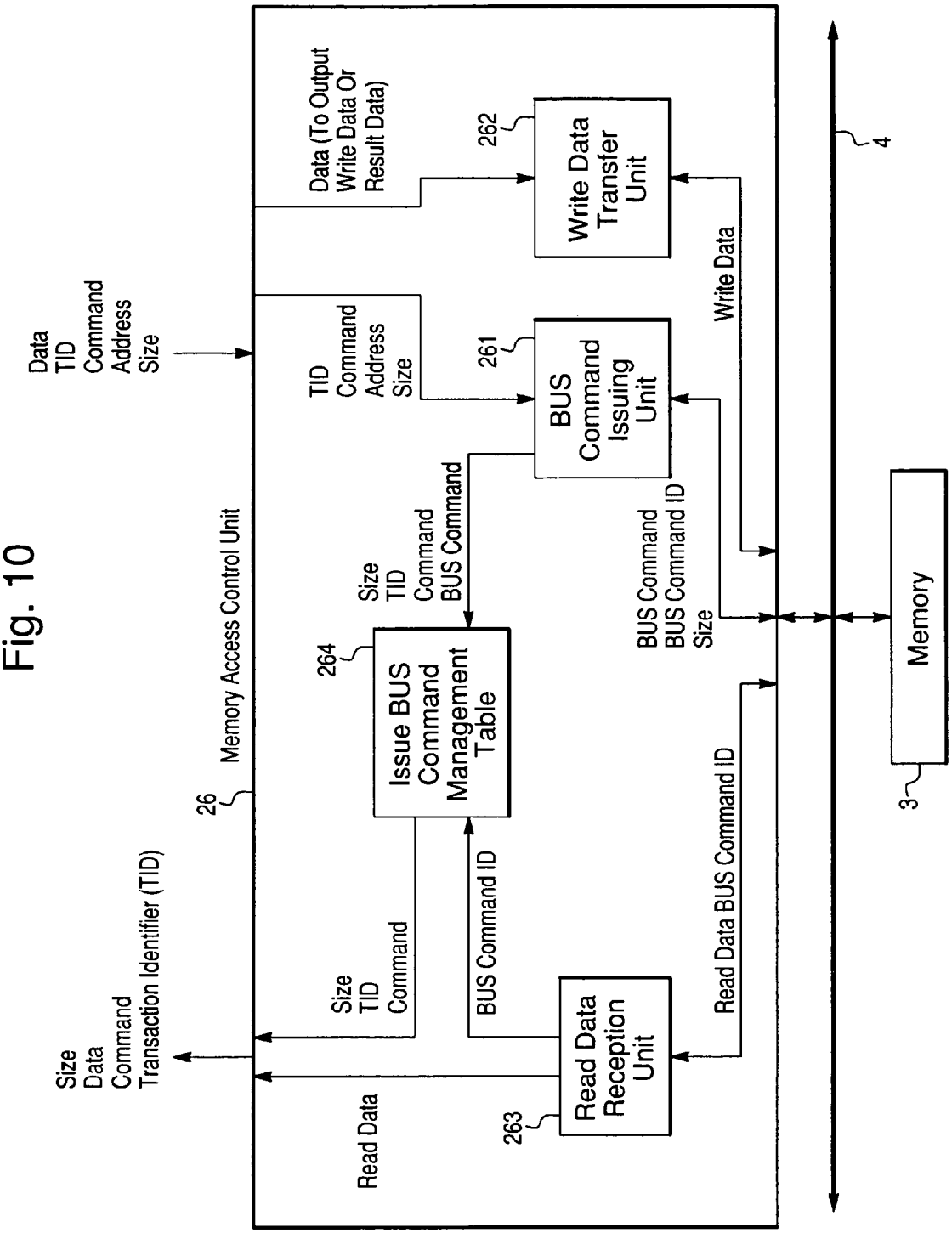
FIG. 10 is a block diagram illustrating an exemplary configuration of a memory access control circuit contained in the stream processor illustrated in FIG. 9.

FIG. 10 is a block diagram illustrating an exemplary configuration of the memory access control circuit contained in the stream processor illustrated in FIG. 9.

As illustrated in FIG. 10, memory access control circuit 26 of this embodiment comprises bus command issuing unit 261 for transferring a command to write data or a command to read data to memory 3; write data transfer unit 262 for transferring data to be written into memory 3; read data reception unit 263 for receiving data read from memory 3; and issued bus command management table 264 for accumulating information to identify data to be read from memory 3. Memory access control circuit 26 and memory 3 are interconnected, for example, through bus 4. As described above, memory access control circuit 26 of this embodiment has functions of reading data from memory 3, and supplying the read data to a specified channel, similar to input DMA circuit 21. Therefore, stream processor 2 and memory 3 may be interconnected, for example, using a cross-bar switch or the like so as to avoid a conflict when both input DMA circuit 21 and memory access control circuit 26 attempt to access memory 3.

Upon receipt of the access command (read command or write command) to memory 3, TID, data size information, destination address, and next-processed command for specifying processing which is resumed when data read from memory 3 is returned from data path unit 231 of array type processor 23, bus command issuing unit 261 transfers an access command to memory 3 through bus 4.

When data is written into memory 3, bus command issuing unit 261 accumulates a write address indicative of the destination and information on the size of the data, while write data transfer unit 262 accumulates data to be written into memory 3 (write data). The data accumulated in write data transfer unit 262 is transferred to memory 3 in accordance with the write command issued by bus command issuing unit 261 and bus protocol rules, and stored in an area specified by the address of memory 3.

When data is written into memory 3, data path unit 231 of array type processor 23 need not deliver the TID. On the other hand, when data is read from memory 3, an identifier for managing the traffic on bus 4, referred to as a "bus command ID," and a read command are transferred from bus command issuing unit 261 to memory 3 in accordance with the protocol rules of bus 4. The bus command ID appended to the read command is returned to read data reception unit 263 together with data read from memory 3. Thus, read data reception unit 263 can determine, with the aid of the bus command ID, which read command has read the data. Bus command issuing unit 261 stores corresponding size information, address, TID, and next-processed command in association with one another in a tabular format for each entry addressed by the bus command ID in issued bus command management table 264. Upon receipt of data read from memory 3, read data reception unit 263 retrieves information on the size of the data, TID, and the next-processed command from a corresponding entry of issued bus command management table 264 using the bus command ID, and supplies input FIFO 24 with the retrieved information together with the read data.

If any read command is to be issued next, the present invention, by using the bus command ID as described above, enables a read command to be issued, even before read data that corresponds to a certain read command is returned. The bus command ID distinguishes currently issued commands, and facilitates the correspondence of the bus command ID to an associated read command by returning the bus command ID together with the read command.

In this embodiment, with the use of the bus command ID, memory access control circuit 26 can successively issue access commands to memory 3, so that data can be read from memory 3 at a high throughput.

Next, referring to the drawings, a description will be given of the operation of stream processor 2 in this embodiment.

Figure 11:
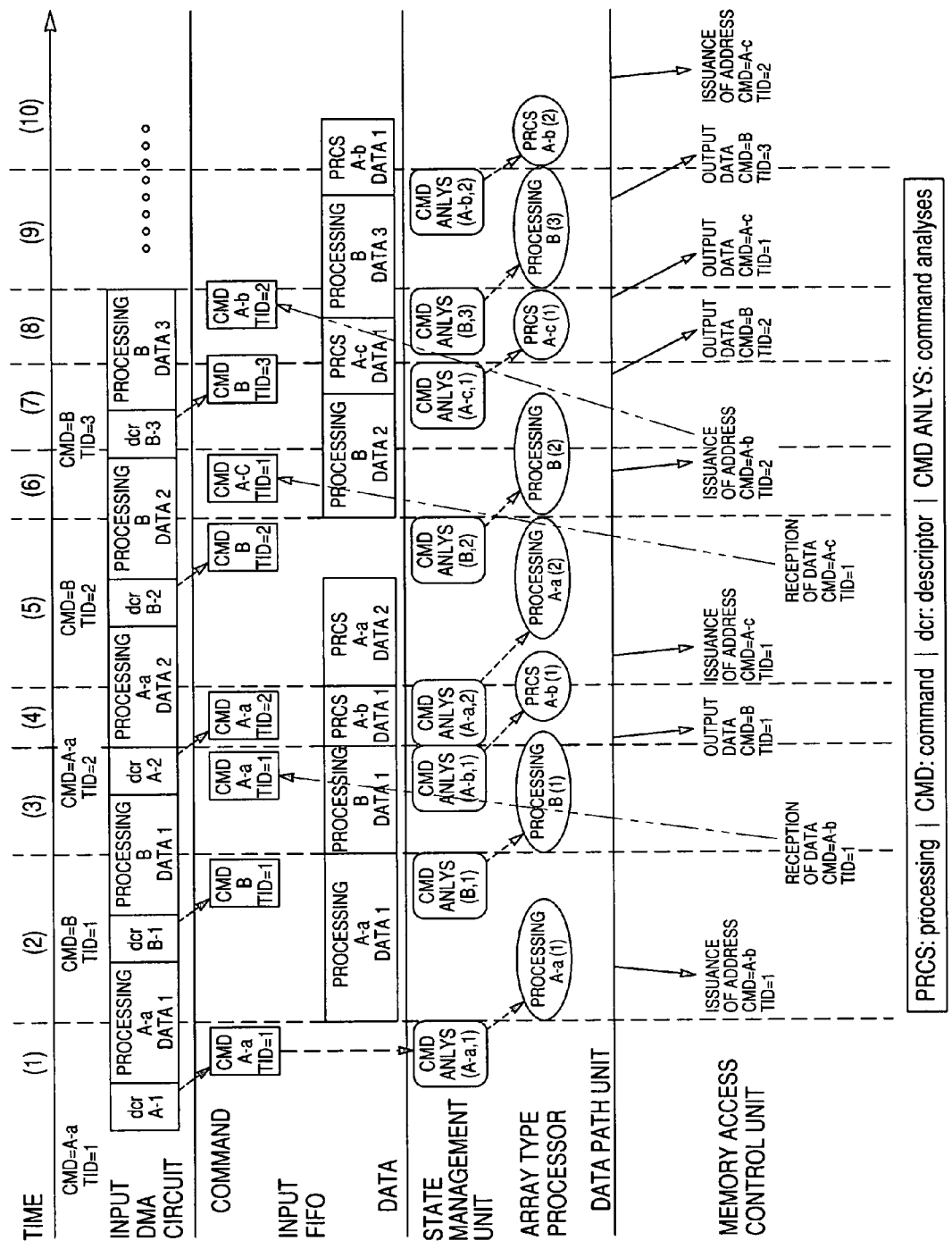
FIG. 11 is a timing chart representing an exemplary operation of the stream processor illustrated in FIG. 9.

FIG. 11 is a timing chart representing an exemplary operation of the stream processor illustrated in FIG. 9.

The operation of input DMA circuit 21 represented in FIG. 11 shows descriptors applied to input DMA circuit 21, and data to be processed in sequentially. Also, in input FIFO 24 shown in FIG. 11, the operation of command queue 242 represents timings at which a variety of commands are registered, and the operation of data queue 241 represents timings at which data to be processed is applied. In the operation of array type processor 23 shown in FIG. 11, the operation of state management unit 232 represents timings at which a variety of commands are received, and timings at which appropriate processing is started in accordance with the results of analyses on the commands, and the operation of data path unit 231 represents timings at which data to be processed corresponding to respective commands are applied, and specified operational processing is executed. State management unit 232 controls the processing executed by data path unit 231 when it does not analyze a command.

The following description will be given of a situation in which array type processor 23 executes two processing sessions A, B. Assume, however, that processing session A is divided into processing sub-sessions A-a, A-b, A-c which are executed at timings at which accesses are made to memory 3. There are two sets of data 1, 2 which are used for processing session A. On the other hand, processing session B is not divided when this is executed, but three sets of data 1, 2, 3 are used for processing session B.

Assume that input DMA circuit 21 is applied first with descriptor A-1 which includes command A-a for executing processing sub-session A-a, and TID=1 indicative of processing of data set 1, followed by descriptor B-1 including command B for executing processing session B, and TID=1 indicative of processing of data set 1; descriptor A-2 including command A-a of executing processing sub-session A-a, and TID=2 indicative of processing of data set 2; descriptor B-2 including command B for executing processing session B, and TID=2 indicative of processing for data set 2; and descriptor B-3 including command B for executing processing session B, and TID=3 indicative of processing of data set 3. These descriptors are entered in the foregoing order.

Also, the following description will be given of an example in which data size is not transferred to command queue 242. Assume that "cycle" used in the following description does not mean a clock cycle but a processing step.

(1) As shown in FIG. 11, upon receipt of descriptor A-1, input DMA circuit 21 first extracts command A-a and TID=1 from received descriptor A-1, and transfers them to command queue 242.

State management unit 232 of array type processor 23, when recognizing that an entry to be next processed has been stored in command queue 242, analyzes the command within the entry, and instructs data path unit 231 to start processing sub-session A-a in the next cycle (2). During the analysis of command A-a, input DMA circuit 21 receives data set 1 (data set 1 for processing sub-session A-a), subsequent to descriptor A-1, which is processed by command A-a.

(2) Upon receipt of data set 1 for processing sub-session A-a, input DMA circuit 21 transfers the received data to data queue 241. On the other hand, after starting processing sub-session A-a, data path unit 231 of array type processor 23 receives data 1 for processing sub-session A-a stored in data queue 241, and executes processing sub-session A-a (on data set 1).

Input DMA circuit 21, after termination of the transfer of data set 1 for processing sub-session A-a, to data queue 241, receives descriptor B-1 which is next processed, extracts command B and TID=1 from descriptor B-1, and transfers them to command queue 242.

State management unit 232 of array type processor 23 lets data path unit 231 execute processing of sub-session A-a (on data set 1), and immediately just before the processing of sub-session is completed, terminates command analysis command B and TID=1. Then, state management unit 232 instructs data path unit 231 to start processing session B in the next cycle (3) subsequent to the completion of processing sub-session A-a.

As a read command is issued from data path unit 231 at the end of processing sub-session A-a (on data set 1), memory access control circuit 26 holds an address, TID (=1) and command A-b which are transferred together with the read command, and transfers to memory 3 the address, read command and bus command ID given to the read command corresponding thereto.

(3) Input DMA circuit 21 receives, subsequent to descriptor B-1, data set 1 (data set 1 for processing session B) involved in the processing associated with descriptor B-1, and transfers data set 1, for processing session B, to data queue 241 upon termination of transfer of data set 1, for processing sub-session A-a, to data path unit 231 by data queue 241.

Data path unit 231 of array type processor 23, after starting processing session B, receives data set 1, for processing session B, stored in data queue 241, and executes processing session B (on data set 1).

Data read from memory 3 in response to the read command issued in the aforementioned (2) is returned to memory access control circuit 26. Since this read command is appended to the bus command ID, memory access control circuit 26 transfers command A-b corresponding to the bus command ID and TID=1 to command queue 242.

State management unit 232 of array type processor 23 lets data path unit 231 execute processing of session B (on data 1) and, immediately just before the processing of the sub-session is completed, terminates command analysis command A-b and TID=1. Then, state management unit 232 instructs data path unit 231 to start processing sub-session A-b (on data set 1) in the next cycle (4) subsequent to the completion of processing session B (on data set 1).

Input DMA circuit 21 receives next descriptor A-2 after the termination of a transfer of data set 1 for processing session B to data queue 241.

(4) Input DMA circuit extracts command A-a and TID=2 from descriptor A-2 that has been received in the aforementioned cycle (3), and transfers them to command queue 242.

Input DMA circuit 21 also receives, subsequent to descriptor A-2, data set 2 (data set 2 for processing sub-session A-a) involved in the processing associated with descriptor A-2.

After data queue 241 has terminated the transfer of data set 1 for processing session B to data path unit 31, memory access control circuit 26 transfers data set 1 for processing sub-session A-b, read from memory 3, to data queue 241. After starting processing sub-session A-b (on data set 1), data path unit 231 of array type processor 23 receives data set 1 for processing sub-session A-b, stored in data queue 241, and executes processing sub-session A-b (on data set 1).

Upon receipt of data resulting from processing session B executed by data path unit 231 in the aforementioned cycle (3), memory access control unit 26 transfers the received data to memory 3 for storage in an address area specified by descriptor B-1.

State management unit 232 of array type processor 23 lets data path unit 231 execute processing of sub-session A-b (on data set 1) and, immediately just before the processing of the sub-session is completed, terminates command analysis command A-a and TID=2. Then, state management unit 232 instructs data path unit 231 to start processing sub-session A-a (on data set 2) in the next cycle (5) subsequent to the completion of processing sub-session A-b (on data set 1).

(5) After data queue 241 has terminated the transfer of data set 1 for processing sub-session A-b to data path unit 231, input DMA circuit 21 transfers data set 2 for processing sub-session A-a to data queue 241. Also, input DMA circuit 21 receives next descriptor B-2, subsequent to data set 1 for processing sub-session A-b, extracts command B and TID=2 from received descriptor B-2, and stores them in command queue 242.

After data path unit 231 has started processing sub-session A-a (on data set 2), state management unit 232 of array type processor 23 lets data path unit 231 execute processing of sub-session A-a (on data set 2) and, immediately just before the processing of the sub-session is completed, terminates command analysis command B and TID=2.

Then, state management unit 232 instructs data path unit 231 to start processing session B (on data set 2) in the next cycle (6) subsequent to the completion of processing sub-session A-a (on data set 2). Input DMA circuit 21 receives, subsequent to descriptor B, data set 2 involved in the processing associated with descriptor B-2, while it is analyzing command B.

As a read command is issued from data path unit 231 at the end of processing sub-session A-b (on data set 1), memory access control circuit 26 holds an address, TID (=1) and command A-c that have been transferred together with the read command, and transfers to memory 3 the address, read command and a bus command ID given to the read command corresponding thereto.

Memory access control circuit 26 receives the data read from memory 3 and returned thereto in response to the read command issued in cycle (5). Since this read command is appended to the bus command ID, memory access control circuit 26 transfers command A-c and TID=1 corresponding to the bus command ID to command queue 242 in the next cycle (6).

(6) Upon receipt of data set 2 for processing session B, input DMA circuit 21 transfers received data 2 to data queue 241. On the other hand, data path unit 231 of array type processor 23, after starting to process of processing session B, receives data set 2 for processing session B, stored in data queue 241, and executes processing session B (on data set 2).

As a read command is issued by data path unit 231 at the end of processing sub-session A-a (on data set 2), memory access control circuit 26 holds an address, TID (=2) and command A-b that have been transferred together with the read command, and transfers to memory 3 the address, read command and a bus command ID given to the read command corresponding thereto.

After the termination of the transfer of data set 2 for processing session B to data queue 241, input DMA circuit 21 receives next descriptor B-3.

(7) Upon receipt of descriptor B-3, input DMA circuit 21 extracts command B and TID=3 from received descriptor B-3, and transfers them to command queue 242.

State management unit 232 of array type processor 23 lets data path unit 231 execute processing session B (on data set 2) started in the aforementioned cycle (6), and terminates the command analysis on command A-c and TID=1 transferred to command queue 242 in the aforementioned cycle (6). Then, state management unit 232 instructs data path unit 231 to start processing sub-session A-c (on data set 1) in the next cycle (8) subsequent to the completion of processing sub-session A-c (on data set 1).

After data queue 241 has terminated the transfer of data set 2 for processing session B to data path unit 231, memory access control circuit 26 transfers data set 1 for processing sub-session A-c, read from memory 3, to data queue 241.

Memory access control circuit 26 receives the data read from memory and returned thereto in response to the read command issued in the aforementioned cycle (6). Since this read command is appended to a bus command ID, memory access control circuit 26 transfers command A-b and TID=2, that corresponds to the bus command ID, to command queue 242. Here, since a higher priority is given to an access to command queue 242 made by input DMA 21, memory access control circuit 26 waits until input DMA circuit 21 has transferred stored command B and TID=3 to state management unit 232 of array type processor 23, and then transfers command A-b and TID=2 to command queue 242 in the next cycle (8).

(8) Input DMA circuit 21 receives, subsequent to descriptor B-3, data set 3 involved in the processing associated with descriptor B-3. When data queue 241 has terminated the transfer of data set 1 for processing sub-session A-c to data path unit 231, input DMA circuit 21 stores data set 3 for processing session B in data queue 241.

After starting to process of processing sub-session A-c, data path unit 231 of array type processor 23 receives data set 1 for processing sub-session A-c, stored in data queue 241, and executes processing sub-session A-c (on data set 1).

State management unit 232 of array type processor 23 lets data path unit 231 execute processing sub-session A-c (on data 1), and terminates the command analysis on command B and TID=3 by the time the processing session is completed.

Upon receipt of data resulting from processing session B (on data set 2), executed by data path unit 231, memory access control circuit 26 transfers the received data to memory 3 for storage in an address area specified by descriptor B-2.

(9) When data queue 241 has terminated the transfer of data set 3 for processing session B to data path unit 231, input DMA circuit 21 stores data set 2 for processing sub-session A-b in data queue 241.

State management unit 232 of array type processor 23 lets data path unit 231 execute processing session B (on data set 3), and terminates the command analysis on command A-b and TID=2 immediately just before the processing session is completed.

Then, state management unit 232 instructs data path unit 231 to start processing sub-session A-b (on data set 2) in the next cycle subsequent to the completion of processing session B.

Upon receipt of data resulting from processing sub-session A-c (on data set 1), executed by data path unit 231, memory access control circuit 26 transfers the received data to memory 3 for storage in an address area specified by descriptor A-1.

(10) After starting to process of processing sub-session A-b, data path unit 231 of array type processor 23 receives data set 2 for processing sub-session A-b, stored in data queue 241, and executes processing sub-session A-b.

As a read command is issued by data path unit 231 at the end of processing sub-session A-b (on data set 2), memory access control circuit 26 holds an address, TID (=2) and command A-c that are transferred together with the read command, and transfers to memory 3 the address, read command and a bus command ID given to the read command corresponding thereto.

Subsequently, memory access control circuit 26 transfers command A-c and TID=2, that corresponds to the bus command ID returned from memory 3, to command queue 242, and transfers data set 2 for processing A-c to data queue 241 in a manner similar to the aforementioned cycles (3) and (4). After state management unit 232 has terminated the analysis on command A-c and TID=2, array type processor 23 instructs data path unit 231 to execute processing sub-session A-c (on data set 2), and stores data resulting from the processing in memory 3 through memory access control circuit 26.

Here, a description will be given of the importance of the TID used in the stream processor of this embodiment.

For example, when processing session A is divided into processing sub-session A-a and processing sub-session A-b, processing sub-session A-b must be started by resuming the processing not only on data read from memory 3 but also on intermediate data which has been held when processing sub-session A-a was completed.

Consider a scenario in which there are a plurality of data sets which are to be processed in processing session A, and in which the respective data sets are divided for processing sub-session A-a and processing sub-session A-b, and are to be processed in an arbitrary order. Assume herein that processing session A is executed in the following sequence: processing sub-session A-a on data set 1, processing sub-session A-a on data set 2, processing sub-session A-b on data set 1, and processing sub-session A-b on data set 2.

In the foregoing scenario, to execute processing sub-session A-b on data set 1, since there is an intermediate data set associated with data set 1 and an intermediate data set associated with data set 2, as a result of processing sub-session A-a, one of the intermediate data sets must be read.

The stream processor of this embodiment distinguishes data sets from one another using transaction identifiers (TID), and divides a data storage area contained in the array type processor in accordance with TID's for use in storing data sets, thereby enabling an optimal intermediate data set to be read therefrom.

Figure 12:
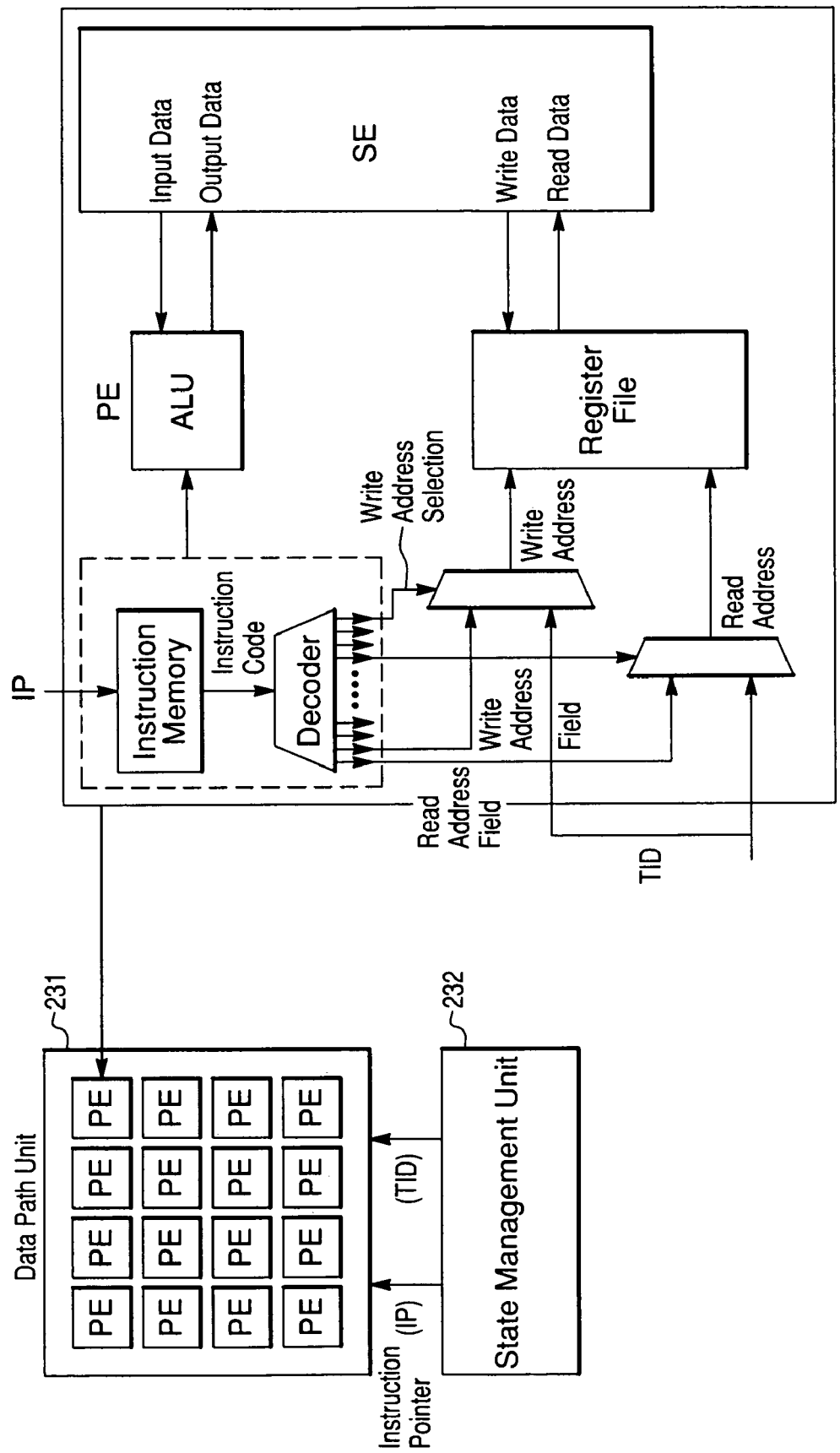
FIG. 12 is a block diagram illustrating a detailed exemplary configuration of the array type processor shown in FIG. 9.

As illustrated in FIG. 12, each of processor elements (PE) mounted in data path unit 231 of array type processor 23 comprises at least one unit for holding data, called a "register file" (see aforementioned Patent Document 2). Generally, data path unit 231 reads an instruction code that corresponds to specified processing from an instruction memory with reference to an instruction pointer (IP) supplied from state management unit 232. In this event, the instruction code is decoded by a decoder, and part of the decoded instruction code serves as a read address (read address field) to read data from the register file, or serves a write address (write address field) to write data into the register file.

Data path unit 231 contained in the array type processor of this embodiment uses the register files contained in the processor elements as data storage areas for holding intermediate data sets. Also, the TID supplied from state management unit 232 can be used as a read address or a write address of an intermediate data set which is given to a register file. Specifically, a read address selection flag is generated from the decoder contained in the processor element for selecting TID or read address field. Also, the processor element is provided with a selector for giving TID or the value in the read address field to the register file in accordance with the read address selection flag.

Likewise, a write address selection flag is generated from the decoder contained in the processor element for selecting TID or write address field. Further, the processor element is provided with a selector for giving TID or the value in the write address field to the register file.

Then, when an intermediate data set is read, the read address selection flag, causes the selector to select the value of TID and the selected value of TID is supplied to register files which hold intermediate data sets. In this event, read data (intermediate data set) is read from the register file specified by the value of TID through a switch element (SE).

On the other hand, when an intermediate data set is written, the write address selection flag, causes the selector to select the value of TID and the value of TID is supplied to register files which hold intermediate data sets. In this event, write data (intermediate data set) is written into a register file specified by the value of TID through the switch element (SE).

In the configuration as described above, a plurality of intermediate data sets can be preserved without making duplicates, and any of the intermediate data sets stored respectively in a plurality of register files can be identified by the value of TID. Therefore, when processing of a divided sub-session is resumed, an appropriate intermediate data can be read from a register file using the value of TID.

In a register file which is not used for the purpose of holding an intermediate data set, the value of a read address field is delivered from the selector in response to the read address selection flag. In this event, read data retrieved from the register file through the switch element (SE) is used for other processing.

Likewise, in a processor element or a register file which is not used for the purpose of holding an intermediate data set, the value of a write address field is delivered from the selector in response to the write address selection flag. In this event, write data used for other processing is stored in the register file through the switch element (SE).

While the foregoing description has shown an example in which the register file contained in the processor element is used as a data storage area for holding an intermediate data set, the processor element may be provided with an internal memory other than the register file, in which case an appropriate data set can be selected from a plurality of intermediate data sets by applying an approach, similar to the foregoing, to the internal memory. Also, while the foregoing description has shown an example in which the TID is used as is, as the address, the TID may be included in part of an address, such as by using the TID as an upper bit of the address, thereby using divided data storage areas.

The function of reading and writing an intermediate data set from and into the register file using the value of TID is not described either in Patent Documents 1, 2 or in Non-Patent Document 1.

According to the stream processor of this embodiment, memory access control circuit 26 reads data from memory 3 in accordance with a read command generated by data path unit 231, and transfers data read from memory 3, and a next-processed command and TID corresponding thereto to array type processor 23, so that array type processor 23, upon resuming processing the divided sub-session, can acquire commands and data required for processing the divided sub-session, and can therefore always resume the processing sub-session even if array type processor 23 has once interrupted the processing sub-session due to an access to memory 3.

Thus, array type processor 23 need not interrupt the operation, from the issuance of a read command to memory 3 to a transfer of the read data back thereto, as is the case with the conventional array type processor, but can accept other processing for execution. Consequently, the array type processor 23 further improves the processing efficiency, resulting in improved processing efficiencies of stream processor 2 equipped with the array type processor and improved overall information processing apparatus.

Generally, a CPU needs to sequentially read data from memory to execute processing. For this reason, a CPU-based information processing apparatus suffers a wait time, from the issuance of a read command to the memory to the return of read data, which causes a bottleneck in the processing speed of the information processing apparatus.

The information processing apparatus of the present invention, which comprises the stream processor in the first to third embodiments described above, can substantially eliminate work an overhead that results from analyzing commands made by array type processor 23 and work that results from accessing memory 3 to process data faster than the CPU, and can process data faster even in comparison with conventional array type processor 23.

Figure 13:
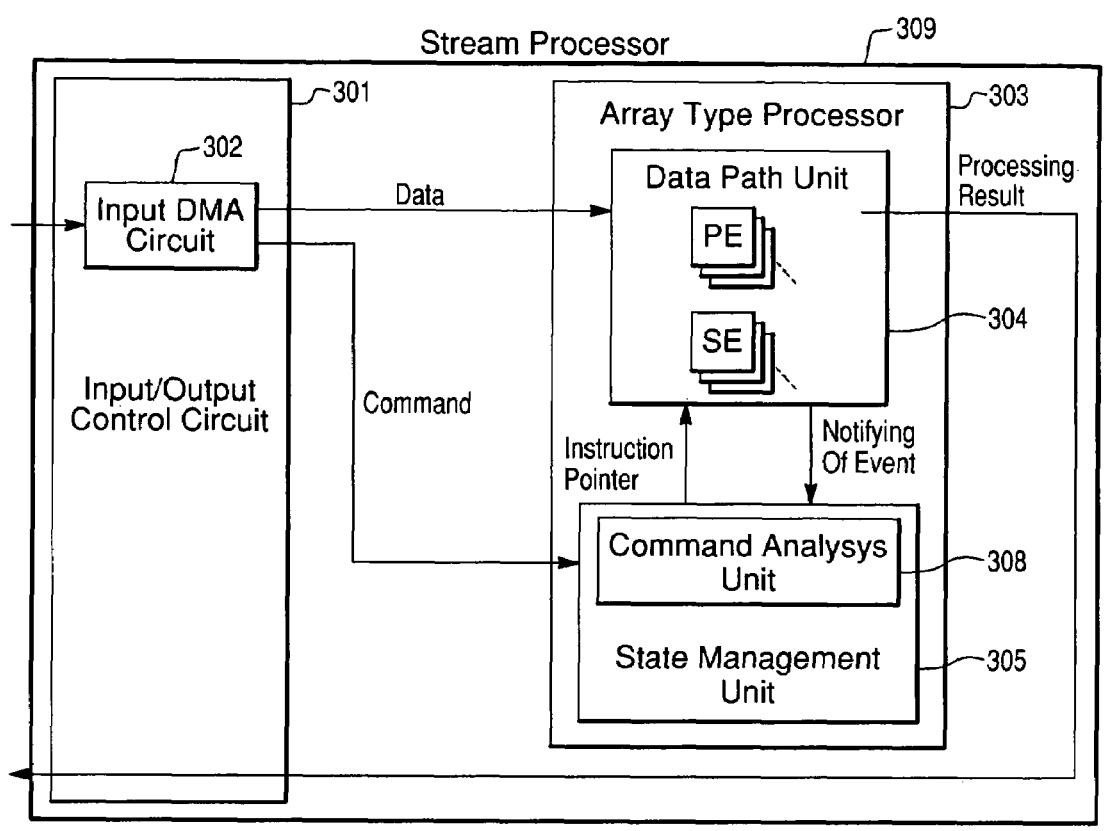
FIG. 13 is a block diagram illustrating another exemplary configuration of the stream processor according to the present invention.

In summary, according to the first to third embodiments described above, the stream processor comprises an input/output control circuit and an array type processor, as illustrated in FIG. 13.

Input/output control circuit 301 shown in FIG. 13 comprises input DMA circuit 302, like the stream processor illustrated in FIG. 4.

Input DMA circuit 302 reads data to be processed, and information including a command that specifies processing the data from an external memory (not shown), and transfers the data to array type processor 303.

Array type processor 303 comprises data path unit 304 and state management unit 305. Input DMA circuit 302 transfers the data read from the external memory to data path unit 304 and the command read from the external memory to state management unit 305.

Data path unit 304 comprises a plurality of processor elements (PE) and switching elements (SE). Data path unit 304 transitions from one state to another in the course of executing processing. This "state" indicates the state of the processor element and the switch element which are components of data path unit 304. In other words, the state of data path unit 304 indicates a situation in which data path unit 304 comprises a particular circuit component, or a situation in which data path unit 304 stores a particular setting value. Data path unit 304 executes predetermined processing on data supplied from input DMA circuit 302 while it transitions from one state to another. In this event, the transition of the state of data path unit 304 is controlled by state management unit 305. Each state of data path unit 304 is assigned a state number corresponding thereto, and state management unit 305 controls transitions among the data path states having a state numbers.

State management unit 305 comprises the aforementioned state transition table memory, sequence unit, and control information memory for controlling the state number. State management unit 305 determines a next state number by the sequence unit in accordance with transition rules (state transition rules) written in the state transition table memory, sequentially causes the state of data path unit 304 to transition in accordance with the transition rules, thereby requiring data path unit 304 to execute predetermined processing. The control information memory stores an instruction pointer which indicates an address in an instruction memory for storing an instruction code associated with a state number. The transition rules refer to information indicative of a transition process in each state from the start to the end of processing executed by data path unit 304. For example, the transition rules may be information which includes state numbers corresponding to the respective states of data path unit 304, arranged in the order of transitions, from the time that data path unit 304 starts processing to the time that it completes the processing, or information indicative of the relationship between a state number assigned to a certain state and a state number assigned to a state subsequent thereto.

Before the stream processor starts the processing, the transition rules are stored in the state transition table memory. This transition rules include the rules corresponding to a plurality of commands analyzed by command analysis unit 308.

As the state number changes to the next value, state management unit 305 reads an instruction pointer that corresponds to the state number, from the control information memory, and sends it to data path unit 304. This instruction pointer causes the circuit configuration of data path unit 304 (i.e., the circuit configuration comprising a plurality of processor elements and switch elements) to transition to a corresponding state. However the circuit configuration remains unchanged even if the state has transitioned as long as the instruction pointer is the same. State management unit 305 causes the state of data path unit 304 to transition in accordance with the transition rules, thereby requiring data path unit 304 to execute appropriate processing. When the transition reaches a transition number indicative of the completion of processing in accordance with the transition rules, data path unit 304 has completed the processing. At this point, if further processing is required, the stream processor shifts to the next processing operation.

Figure 3:
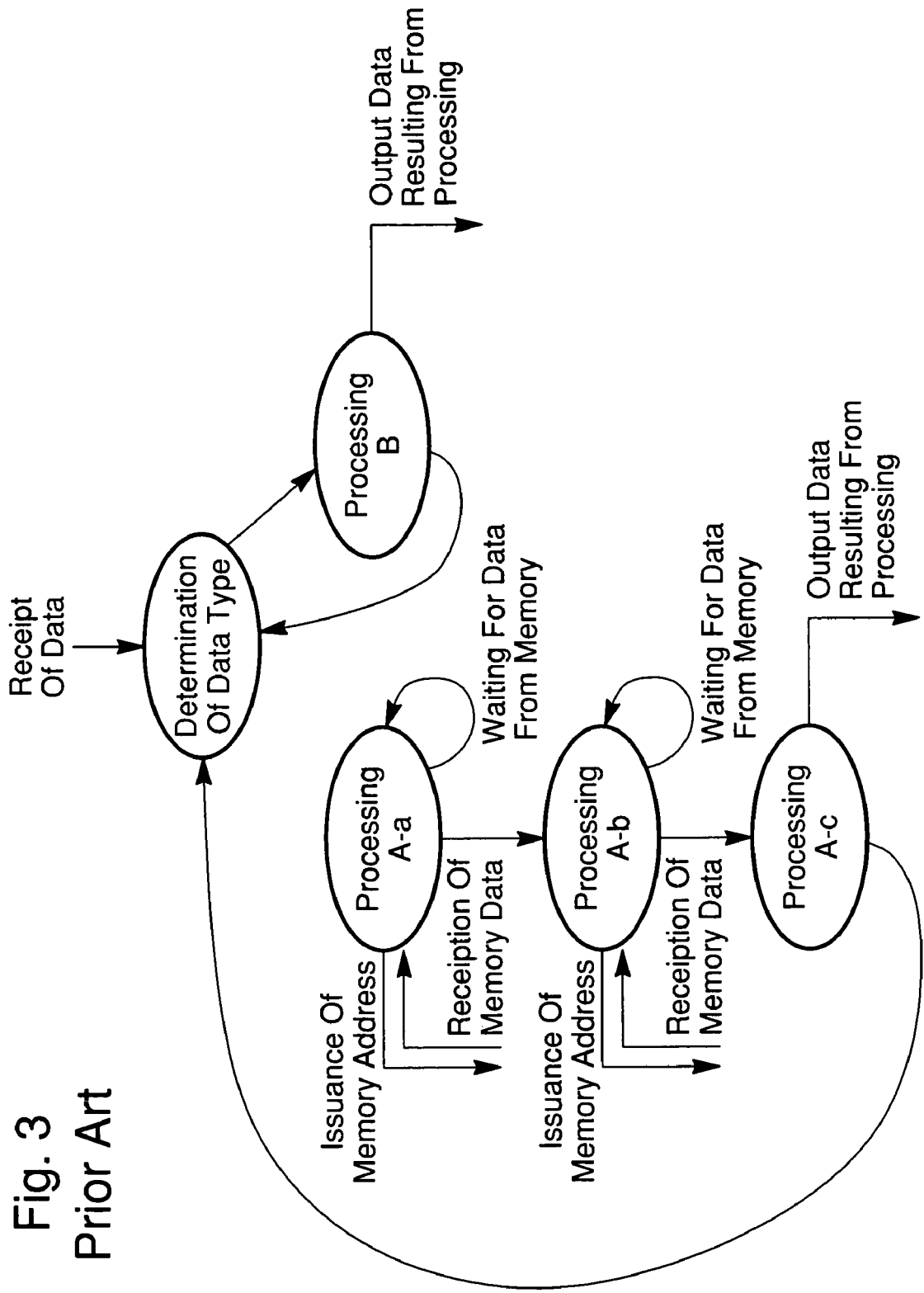
FIG. 3 is a state transition diagram illustrating another exemplary operation of the conventional array type processor.

As illustrated in FIG. 3, when a transition rule branches, depending on the result of intermediate processing, data path unit 304 notifies state management unit 305 of information that indicates to which state a transition should be made, i.e., control information (event) for the branch. When this event is sent to state management unit 305, state management unit 305 determines a state to which data path unit 304 should next transition, issues an instruction pointer corresponding thereto, and causes data path unit 304 to transition to the determined state.

The aforementioned information stored in the descriptor is used as information by input DMA circuit 302, including the command that specifies corresponding processing on the data read from external memory. This command is transferred to state management unit 305 and analyzed by command analysis unit 308 in state management unit 305. Command analysis unit 308 comprises a logic circuit for generating a state number corresponding to the command, and the like. Command analysis unit 308, after delivering the result of an analysis to the sequencer unit of state management unit 305, analyzes a command for the next processing by the time that data path unit 304 has completed the processing that corresponds to the command. The state number, which is the result of the analysis, delivered by command analysis unit 308, is preferably set to match the first state number of the processing executed by data path unit 304.

The stream processor illustrated in FIG. 13 comprises input/output control circuit 301 for reading, from memory, data to be processed, and for reading information including a command for that specifies processing on the data; and array type processor 303 which includes data path unit 304 for executing the processing in accordance with the command, and state management unit 305 for causing the state of data path unit 304 to transition in accordance with state transition process information.

Input/output control circuit 301 comprises input DMA circuit 302 for transferring data, to be processed, to data path unit 304 after transferring a command to state management unit 305.

State management unit 305 comprises command analysis unit 308 for analyzing a command, transferred thereto from input DMA circuit 302, in order to determine the initial state of data path unit 304 from the command. While data path unit 304 is executing processing on data transferred from input DMA circuit 302, input DMA circuit 302 transfers a command for the next processing, read from the memory, to state management unit 305, and command analysis unit 308 analyzes the command.

The initial state determined by command analysis unit 308 is the first state in the transition rule corresponding to the processing that is to be executed by data path unit 304.

After data path unit 304 has reached a state in which the processing is completed, state management unit 305 causes data path unit 304 to transition to the initial state determined by command analysis unit 308, so that data path unit 304 executes the next processing.

Thus, according to the stream processor of the present invention, while data path unit 304 is executing processing, command analysis unit 308 can analyze a command for the next processing operation that will be executed in parallel. This can improve the processing speed and throughput of the stream processor.

While a preferred embodiment of the present invention has been described using specific terms, such description is for illustrative purposes only, and it is to be understood that changes and variations may be made without departing from the spirit or scope of the following claims.

What is claimed is:

1. A stream processor comprising:
a plurality of array type processors, each array type processor including:
   a data path unit for executing a processing of data, and
   a state management unit for controlling a state of said data path unit in accordance with a command supplied to the state management unit specifying processing which should be executed on the data;
a descriptor management table, said table to receive and store descriptors which include information used to identify data;
an input DMA circuit, said DMA circuit including an input coupled to a memory space and including outputs coupled to inputs of the data path units and inputs of the state management units and the descriptor management table; and
a memory access control circuit, said memory access control circuit having inputs coupled to the descriptor management table and to outputs of the data path units and having an output coupled to a memory space, wherein
   the input DMA circuit reads a descriptor and associated data from the memory space, extracts a command from the descriptor, transfers the command to the state management units, registers the descriptor in the descriptor management table and supplies the associated data to data path units.

2. The stream processor according to claim 1, wherein the memory access control circuit receives from the data path units data processed in accordance with the command, refers to the associated descriptor in the descriptor management table to obtain an address in the memory space and writes processed data to the obtained address.

3. The stream processor according to claim 1, further comprising an input FIFO which includes a data queue for temporarily holding data to be processed, supplied from the input DMA circuit to a data path unit, and a command queue for temporarily holding the command supplied from the input DMA circuit to a state management unit, and a transaction identifier corresponding the data to be processed.

4. The stream processor according to claim 1, wherein:
the input DMA circuit supplies a command queue with size information of data to be processed, and
the command queue supplies the size information of the data to the data path units.

5. The stream processor according to claim 1, wherein:
when a data path unit reads data from the memory space in the middle of processing, the data path unit delivers a read command for reading the data from the memory space, an address, a transaction identifier, and a command for specifying processing to be performed on the data read from the memory space, and
the memory access control circuit holds the read command, the address, the transaction identifier, and the command received from said data path unit, reads the data from the area of said memory space indicated by the address, transfers the read data to a data queue, and transfers the command and the transaction identifier corresponding to the read command respectively to a command queue.

6. The stream processor according to claim 1, wherein:
the memory access control circuit supplies a command queue with the size information of data to be processed, and the command queue supplies the size information to a data path unit.

7. The stream processor according to claim 1, wherein:
the memory access control circuit includes an issued command management table for holding a transaction identifier and a command received from a data path unit in association with a bus command ID which is an identifier that corresponds to a read command.

8. The stream processor according to claim 1, wherein:
a data path unit interrupts processing when the data path unit issues a read command, and
the data path unit resumes the interrupted processing upon receipt of the data, from a FIFO data queue, read from the memory space in response to the read command.

9. The stream processor according to claim 3, wherein the input FIFO includes:
a first selector for supplying the data queue with data delivered from the input DMA circuit or the memory access control circuit;
a second selector for supplying the command queue with the command and the transaction identifier delivered from the input DMA circuit or the memory access control circuit; and
a timing control circuit for arbitrating a conflict between data delivered from the input DMA circuit and data delivered from the said memory access control circuit, and for arbitrating a conflict between command and transaction identifiers delivered from the input DMA circuit and command and transaction identifiers delivered from the memory access control circuit.

10. The stream processor according to claim 1, wherein:
a data path unit includes a register file capable of reading intermediate data, which is data in the midst of being processed, and writing the intermediate data using a transaction identifier, in order to temporarily hold the intermediate data.

11. The stream processor according to claim 1, wherein:
the command matches a state number which is the number of a state to which said data path unit should first transition.

12. The stream processor according to claim 1, wherein:
the state management unit includes a command reference table which has previously recorded a relationship between the command and a state number which is a number of a state to which said data path unit should transition.

13. The stream processor according to claim 1, further comprising an output FIFO for temporarily holding processed data delivered from the array type processor for transfer to the memory access control circuit.

14. An information processing apparatus comprising:
the stream processor according to claim 1; and
a memory for storing data used in processing by a host processor and the stream processor.

15. The stream processor of claim 1, wherein:
the descriptor management table includes a descriptor field which specifies a channel within the array type processor for processing associated data.

16. The stream processor of claim 1, wherein:
the descriptor management table includes a descriptor field which specifies a plurality of channels within the array type processor for parallel processing of associated data.

17. The stream processor of claim 1, wherein:
the descriptor management table includes a descriptor field which indicates a return address specifying the memory space location to which processed associated data is to be outputted.

18. The stream processor of claim 1, wherein:
the descriptor management table includes a descriptor field which indicates a transaction identifier corresponding to associated data before and after processing of the data.

* * * * *